(12) United States Patent
Schuyler

(10) Patent No.: US 6,495,037 B1
(45) Date of Patent: Dec. 17, 2002

(54) CAGED FILTER CARTRIDGE ASSEMBLY AND FILTRATION SYSTEMS EMPLOYING THE SAME

(75) Inventor: Charles C. Schuyler, Baltimore, MD (US)

(73) Assignee: Pall Corporation, East Hills, NY (US)

( * ) Notice: Subject to any disclaimer, the term of this patent is extended or adjusted under 35 U.S.C. 154(b) by 34 days.

(21) Appl. No.: 09/707,902

(22) Filed: Nov. 8, 2000

(51) Int. Cl.⁷ .................... B01D 29/52; B01D 27/08; B01D 27/14
(52) U.S. Cl. .................... 210/232; 210/237; 210/238; 210/435; 210/446; 210/447; 210/457; 210/497.01; 210/323.2
(58) Field of Search ............ 210/322, 323.1, 210/323.2, 455, 345, 497.01, 459, 450, 453, 456, 232, 462, 435, 446, 447, 237, 238; 55/315, 323, 341.1, 342

(56) References Cited

U.S. PATENT DOCUMENTS

| | | | |
|---|---|---|---|
| 512,931 A | * 1/1894 | Aims, Jr. et al. | |
| 2,921,686 A | * 1/1960 | Forman et al. | |
| 3,237,775 A | 3/1966 | Porter et al. | 210/323 |
| 3,615,016 A | * 10/1971 | Soriente et al. | |
| 3,747,765 A | * 7/1973 | Nowak | |
| 4,419,234 A | * 12/1983 | Miller et al. | 210/232 |
| 4,552,669 A | 11/1985 | Sekellick | 210/798 |
| 4,588,500 A | 5/1986 | Sprenger et al. | 210/100 |
| 5,256,285 A | 10/1993 | Tomita et al. | 210/234 |
| 5,591,335 A | * 1/1997 | Barboza et al. | 210/323.2 |
| 5,770,066 A | * 6/1998 | Coates | 210/232 |
| 5,795,472 A | 8/1998 | Nurse, Jr. | 210/232 |
| 6,007,718 A | * 12/1999 | Booth | 210/232 |
| 6,342,283 B1 | * 1/2002 | Mozelack et al. | |

FOREIGN PATENT DOCUMENTS

WO          WO99/13958          * 3/1999

* cited by examiner

Primary Examiner—Matthew O. Savage
Assistant Examiner—Marianne S. Ocampo
(74) Attorney, Agent, or Firm—Nixon & Vanderhye P.C.

(57) ABSTRACT

The structural integrity of opposed spaced-apart end plates of caged filter cartridge assemblies is provided solely by individual filter cartridges in the assembly. Preferably, the end plates of the filter cartridge assembly are provided with seat recesses to receive an end portion of respective filter cartridges therein. An annular lock ring associated with each seat recess immovably locks the filter cartridge end portions therewithin. In such a manner, each of the individual filter cartridges serves to structurally unite the opposed spaced-apart end plates one to another in the absence of a tie rod so that the collective torsional and longitudinal rigidity of the assembly is significantly enhanced as compared to conventional tie rod caged filter cartridge assemblies.

36 Claims, 5 Drawing Sheets

CAGED FILTER CARTRIDGE ASSEMBLY AND FILTRATION SYSTEMS EMPLOYING THE SAME

FIELD OF THE INVENTION

The present invention relates generally to the field of filtration assemblies. In its more preferred forms, the present invention relates to multiple tubular filter cartridges which are held together as a unit ("caged") in parallel relationship to one another between spaced-apart end plates, and to the filtration systems which employ the same.

BACKGROUND AND SUMMARY OF THE INVENTION

Caged filter cartridge assemblies are known and have been employed conventionally in fluid-filtration assemblies. Conventional caged filter assemblies typically include an array comprised of a large number (e.g., eighteen) of generally tubular filter cartridges positioned parallel to one another between a pair of spaced-apart end plates. A tie rod extends generally centrally of the filter cartridge array and structurally unites the spaced-apart end plates to form an integral unit.

The integrity of the structural union between the end plates and the filter cartridges provided by the tie rod associated with conventional caged filter assemblies is problematic. Specifically, the tie rod does not impart sufficient torsional rigidity to the conventional caged filter cartridge assemblies. As a result, during shipment and/or handling, the filter cartridges may twist about the axis of the tie rod resulting in some of the seals being broken or damaged between individual ones of the filter cartridges and the end plates. Broken or damaged seals, of course, results in reduced filtration efficiencies during use.

An additional problem associated with conventional caged filter cartridges is potential "dishing" that may be imparted to the end plates by virtue of the tie rod being over-torqued during assembly. That is, there exists a real possibility that the axial compressive force on the end plates provided by the tie rod may be somewhat greater in the immediate vicinity of the tie rod and somewhat lesser at the peripheral annular edge regions of the plates. As a result, the area in the immediate vicinity of the centrally located tie rod may be recessed somewhat as compared to the peripheral annular edges of the plate, thereby resulting in a "dished" appearance. Such "dishing" of the end plates can also lead to broken seals between individual ones of the filter cartridges and the end plates leading to ineffective filtration capabilities during use.

It would therefore be highly desirable if improved caged filter cartridge assemblies could be provided which exhibits increased torsional rigidity without "dishing" the end plates and thereby maintain reliable seals between the individual filter cartridges and such end plates. It is toward providing such improved caged filter cartridge assemblies that the present invention is directed.

Broadly, the present invention is embodied in tie rod-less caged filter cartridge assemblies wherein the structural integrity of the assembly is provided solely by means of the individual filter cartridges. More specifically, according to the present invention, the end plates of the filter cartridge assembly are provided with plural seat recesses each adapted to receive an end portion of a respective filter cartridge. An annular lock ring is associated with each seat recess so as to immovably lock the filter cartridge ends therewithin. In such a manner, each of the individual filter cartridges serves to structurally unite the opposed spaced-apart end plates one to another in the absence of a tie rod so that the collective torsional and longitudinal rigidity of the assembly is significantly enhanced as compared to conventional tie rod assemblies.

These and other aspects and advantages will become more apparent after careful consideration is given to the following detailed description of the preferred exemplary embodiments thereof.

BRIEF DESCRIPTION OF THE ACCOMPANYING DRAWINGS

Reference will hereinafter be made to the accompanying drawings, wherein like reference numerals throughout the various FIGURES denote like structural elements, and wherein.

DETAILED DESCRIPTION OF THE INVENTION

Figure 1:
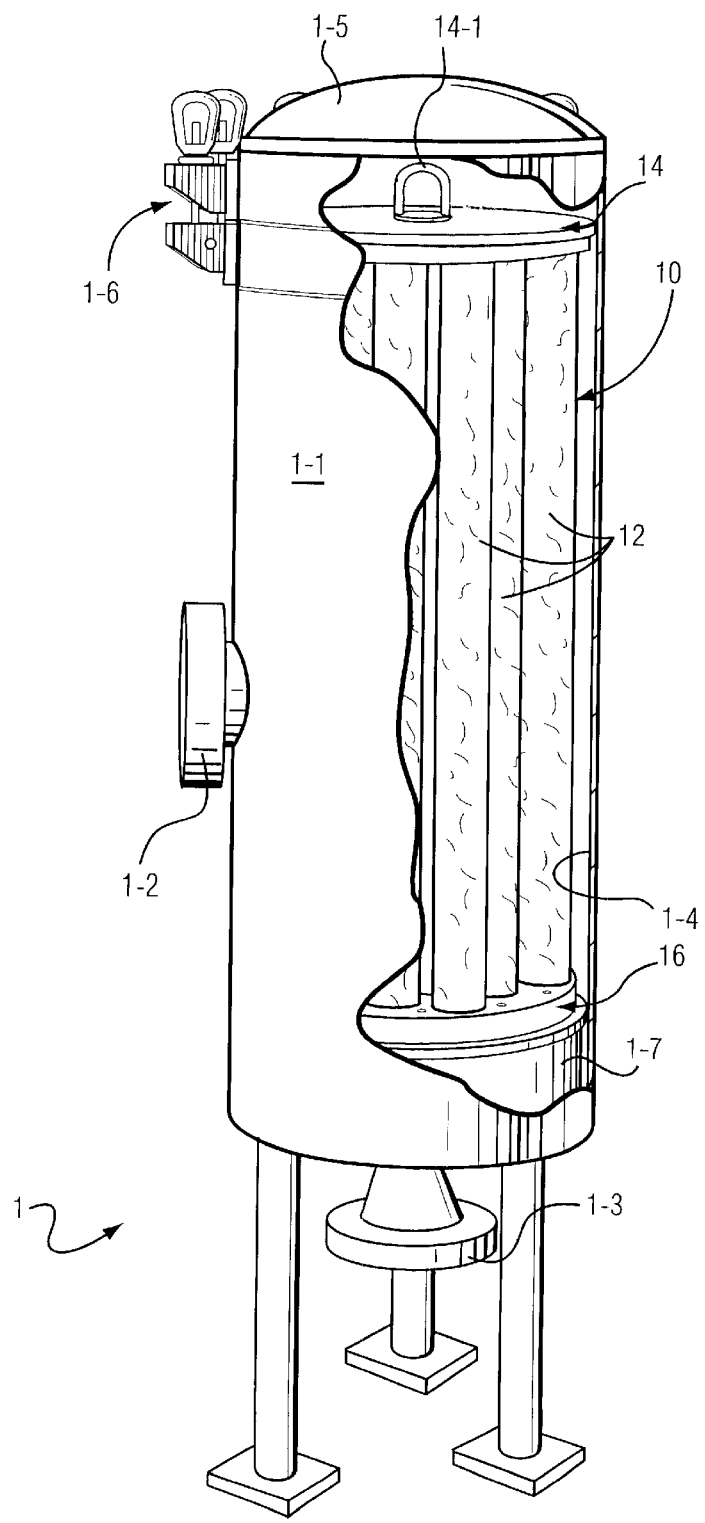
FIG. 1 is an elevational perspective view of a filtration system, partly in section, which employs a caged filter cartridge assembly in accordance with the present invention.

Accompanying FIG. 1 depicts a filtration system 1 which includes a caged filter cartridge assembly 10 in accordance with the present invention. As shown, the filtration system 1 generally includes a cylindrical housing 1-1 having fluid inlets and outlets, 1-2, 1-3, respectively, so as to allow fluid to be filtered to enter the interior cylindrical chamber 1-4 of the housing 1-1. The fluid within the housing 1-1 is thus passed through the filtration medium of the individual filter cartridges 12 positioned between opposed spaced-apart upper and lower end plates 14, 16 (see also FIG. 2) and then discharged therefrom through the fluid outlet 1-3. A generally U-shaped gasket seal is typically provided around the perimetrical edge of the end plate 16 so as to provide a fluid seal between it and the interior wall of the housing 1-1. The cylindrical housing 1-1 is closed at its upper end by cover 1-5 which is securely yet removably coupled to the housing 1-1 by means of conventional swing bolt and eye nut assemblies 1-6. When the cover 1-5 is opened, therefore, the entire caged filter cartridge assembly 10 may be removed from the interior chamber 1-4, assisted as may be necessary by means of powered lift devices attached to the lift ring 18 of the top plate 14. Virtually any cylindrical filter cartridge 12 may be employed in the practice of the present invention. The preferred filter cartridges 12 employed in the present invention are generally tubular elongate structures having a central cylindrical interior fluid passageway and filtration media cylindrically positioned around the central passageway. The filtration media is most preferably a non-woven mass of melt-blown polymeric fibers formed, for example, from thermoplastic polymers, preferably polyolefins such as polypropylene, polyethylene and the like. Especially preferred filter cartridges 12 are those as described more fully in commonly owned U.S. Pat. Nos. 5,591,335 and 6,342,283, the entire content of each being expressly incorporated hereinto by reference.

Figure 2:
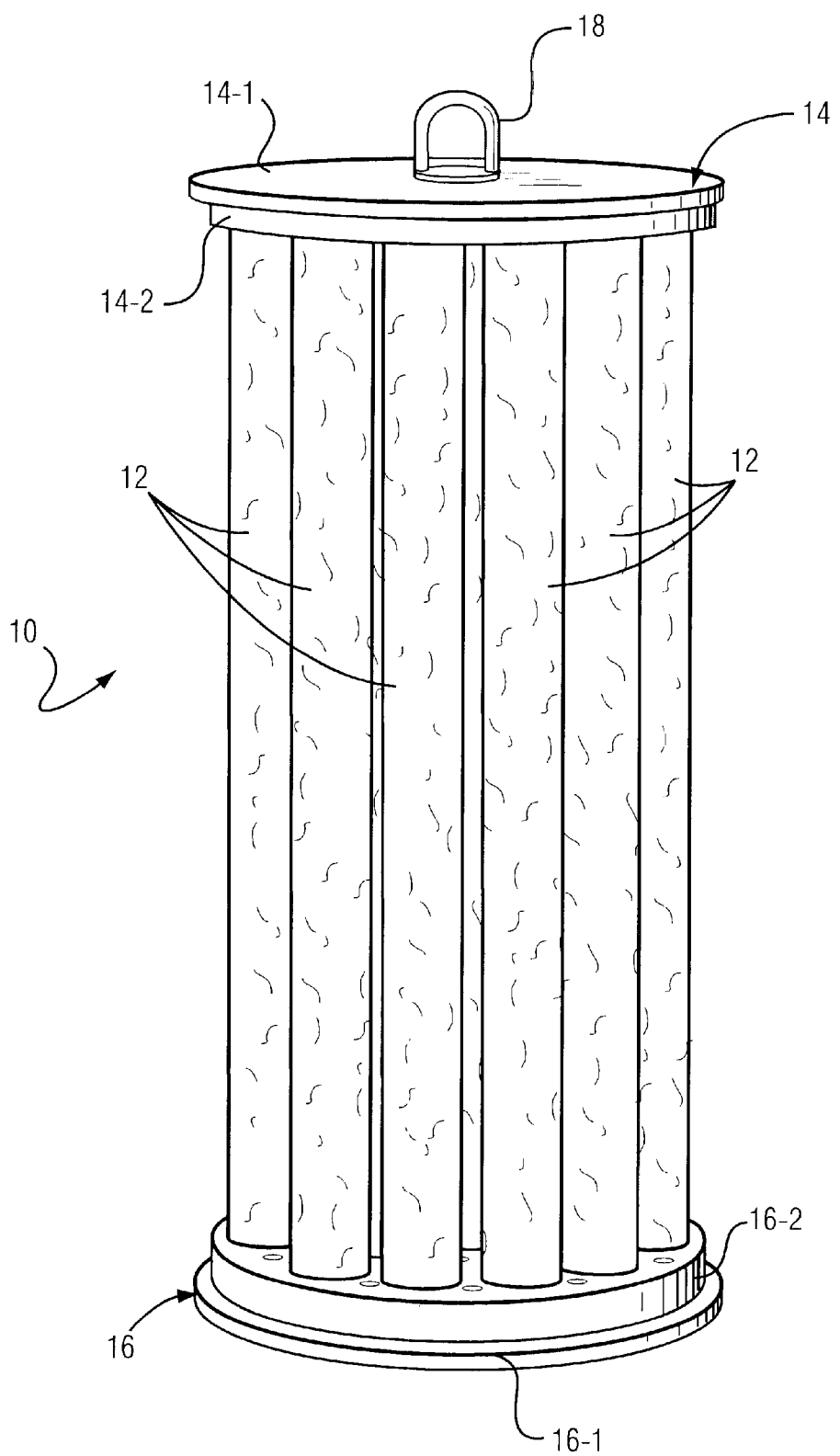
FIG. 2 is an enlarged elevational perspective view of an exemplary caged filter cartridge assembly in accordance with the present invention.
Figure 3:
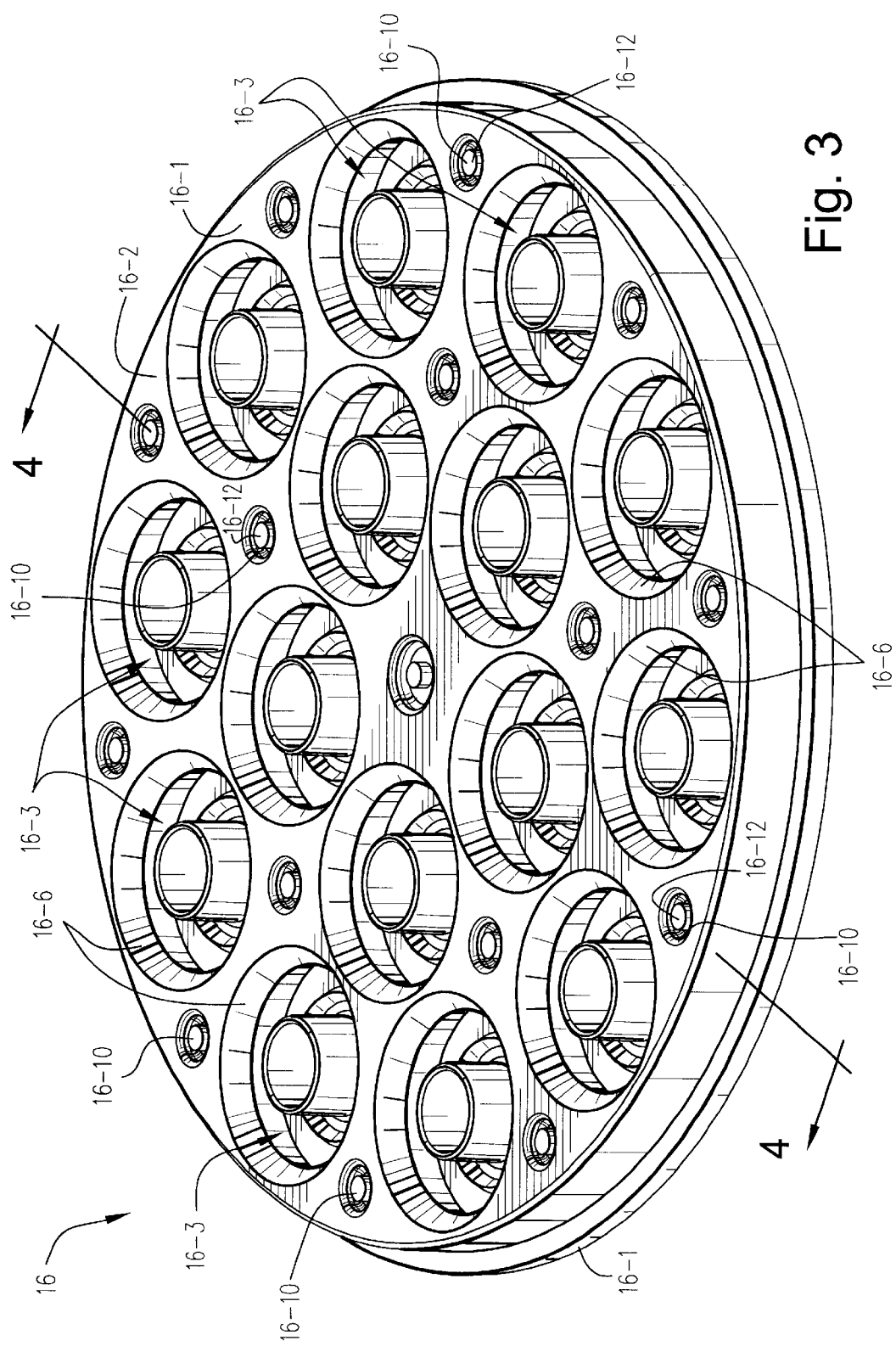
FIG. 3 is an enlarged perspective view of an exemplary end plate employed in the caged filter cartridge assembly in accordance with the present invention.
Figure 4:
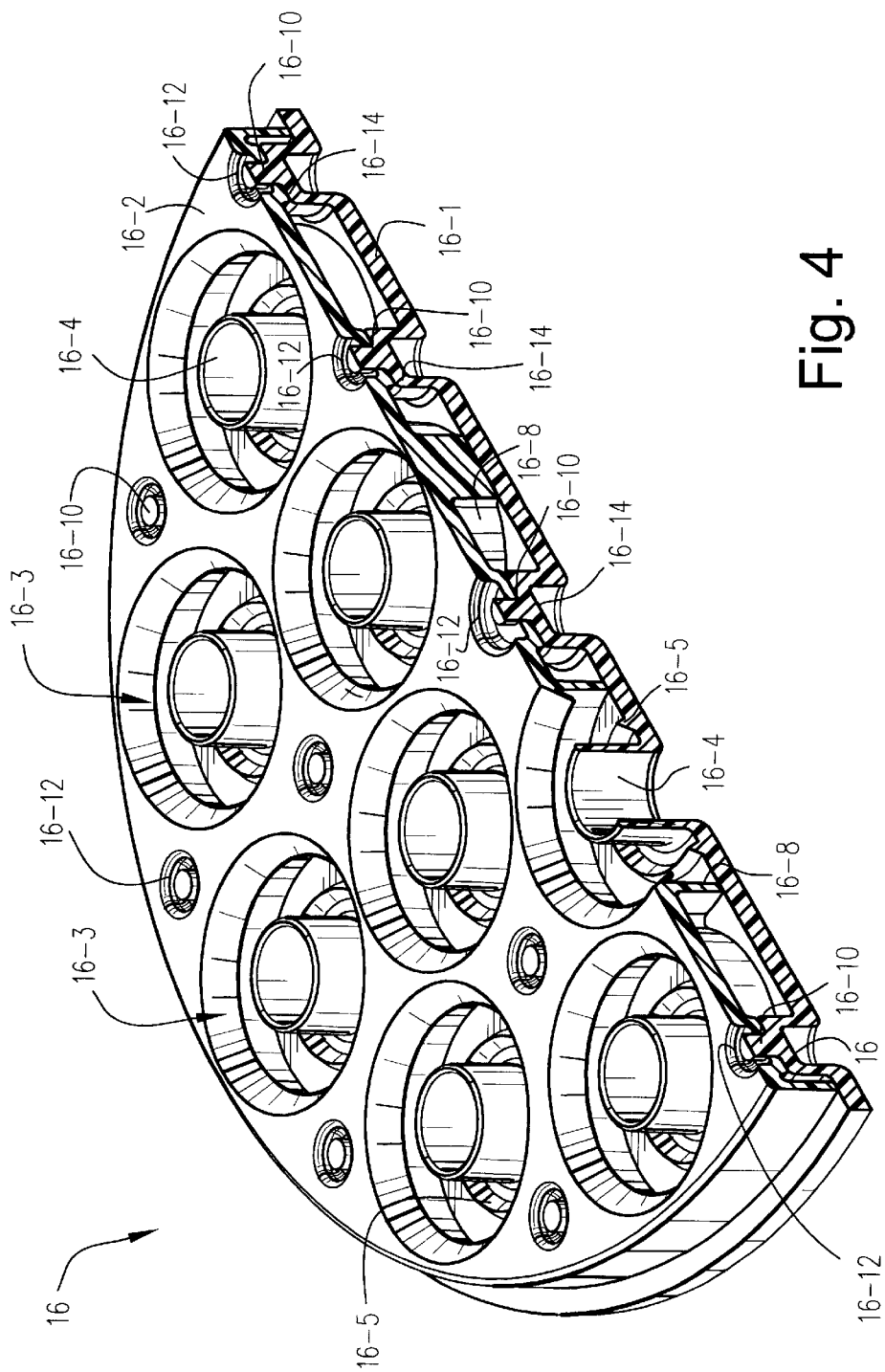
FIG. 4 is an enlarged cross-sectional perspective view of the exemplary end plate depicted in FIG. 3 and taken along line 4—4 therein.

As is perhaps more clearly shown in accompanying FIGS. 2, the end plates 14, 16 of the caged filter cartridge assembly 10 are comprised of generally circular base and seat plates 14-1, 16-1 and 14-2, 16-2, respectively. The structural and functional attributes of such circular base and seat plates 14-1, 16-1 and 14-2, 16-2, respectively, are shown in greater clarity in accompanying FIGS. 3–5 and 6A–6B. In this regard, accompanying FIGS. 3–5 and 6A–6B depict only the end plate 16 as an example of both the end plates 14, 16. It should, however, be understood that, with the exception of the lift hook 18, all structures associated with end plate 16 are likewise embodied in the end plate 14. Thus, the discussion below with respect to end plate 16 applies equally to the end plate 14, even though reference numerals corresponding to the identical structures embodied in end plate 14 do not appear in the accompanying drawing FIGS. 3–5 and 6A–6B.

Figure 5:
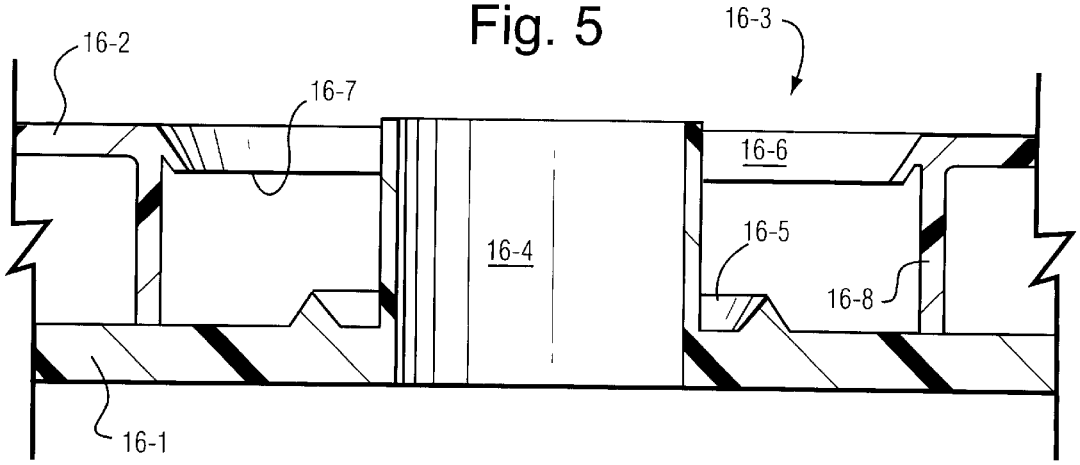
FIG. 5 is an enlarged cross-sectional elevational view of an exemplary recessed filter cartridge seat provided in the end plates of the present invention.

As can be seen, the end plate 16 includes a number of seat recesses, an exemplary few of which are identified in the drawings as reference numeral 16-3. As is perhaps more clearly shown in accompanying FIG. 5, each of the seat recesses 16-3 includes a cylindrical support tube 16-4 projecting outwardly from, and being a unitary part of, the base plate 16-1. The support tube 16-4 is sized so as to be received within the central cylindrical passageway associated with each filter cartridge 12 and thereby direct the filtered fluid into the discharge plenum 1-7 of the filtration system 1 and on to the discharge opening 1-3 in fluid-communication therewith (see FIG. 1). A circular rigid end seal 16-5 is provided as a one-piece structure with the base plate 16-1 and coaxially surrounds the support tube 16-4. As can be seen in FIG. 5, the end seal 16-5 is generally triangularly shaped so that its sharp apex is forcibly embedded within the mass of non-woven fibers constituting the filter media of the filter cartridges 12. As such, the end seal 16-5 provides a seal at the end surface of the filter cartridge 12 when seated within the seat recess 16-3.

A retaining ring 16-6 is provided unitarily as a part of the seat plate 16-2 in coaxially laterally surrounding relationship to both the support tube 16-4 and the end seal 16-5. The retaining ring 16-6 most preferably defines the generatrices of a conical surface and thus establishes an annular edge 16-7 which diametrically constricts the upper region of the recessed seat 16-3. The conical segment shape of the retaining ring 16-6 and its annular edge 16-7 cooperate to ensure that the former is flexed outwardly by insertion of a filter cartridge into the seat recess 16-3 to thereby bias the annular edge 16-7 thereof forcibly into a circumferential region of the mass of non-woven fibers constituting the filtration media of the filter cartridge 12. As such, the retaining rings 16-6 and their annular edges 16-7 establish annular circumferential seals with the filter cartridges 12 when respectively forcibly seated within the seat recesses 16-3.

An annular support wall 16-8 is formed as a unitary structure with the seat plate 16-2 at one end thereof in close annular adjacent proximity to the seat ring 16-6. The opposite end of the support wall 16-8 extends to, and is in contact with, the base plate 16-1. The support wall 16-8 thereby provides annular structural rigidity around the retaining ring 16-6 as well as establishing and maintaining a spaced-apart relationship between the retaining ring 16-6 and the base plate 16-1.

Figure 6A:
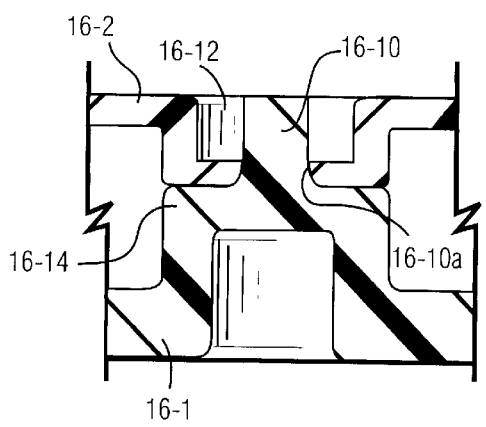
FIGS. 6A and 6B respective depict the coupling post before and after heat-staking so as to rigidly unite the base and seat plate components of the end plates in accordance with the present invention.
Figure 6B:
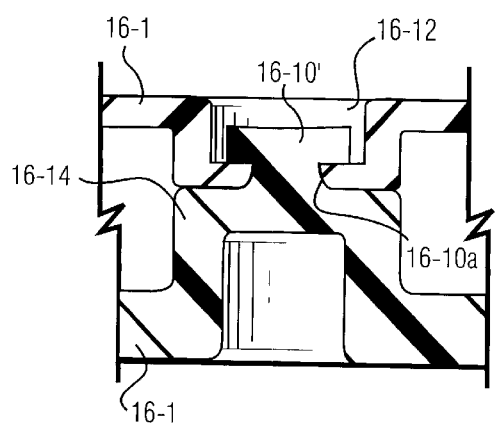

The base and seat plates 16-1 and 16-2 are rigidly united to one another by means of connection posts and wells 16-10 and 16-12, respectively, as is more clearly depicted in accompanying FIGS. 6A and 6B. In this regard, FIG. 6A depicts a state of assembly of the base and seat plates 16-1 and 16-2 whereby such plates are registered with one another so that the connection post 16-10 projects upwardly from the platform 16-14 formed unitarily as part of the base plate 16-1 and through the aperture 16-10a formed in the bottom of the connection well 16-10. Following the registration of the base and seat plates 16-1, 16-2 and the connection posts and wells 16-10 and 16-12 formed unitarily therewith, respectively, the connection posts 16-10 are subject to elevated temperatures so as to melt its top region to form a larger diameter head 16-10' as shown in FIG. 6B. In such a manner, the base and seat plates 16-1, 16-2, respectively, are joined to one another by virtue of heat-staking of the connection post 16-10.

The base and seat plates 16-1 and 16-2 can, however, be joined to one another by virtually any suitable alternative means. For example, the plates 16-1, 16-2 may be glued or otherwise adhesively joined to one another. Alternatively (or additionally), mechanical means such as nut and bolt assemblies, screws (particularly those of the self-tapping variety), and the like may be employed.

In use, caged filter cartridge assembly 10 is fabricated by forcibly inserting respective opposed ends of the individual filter cartridges 12 into the seat recesses formed in each of the end plates 14, 16. As noted previously, inserting the ends of the filter cartridges 12 into the seat recesses will immovably lock the filter cartridges 12 relative to the end plates 16. In addition, both end and circumferential fluid seals will be established. The individual filter cartridges 12 will thus collectively serve to unite structurally the opposed end plates 14, 16 (i.e., in the absence of separate tie rods extending between the end plates 14, 16). As a result, the torsional and longitudinal rigidity of the assembly 10 is substantially improved as compared to conventional tie rod assemblies.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A caged filter cartridge assembly comprising:
   a pair of coaxially spaced-apart end plates, and
   a number of tubular filter cartridges extending between and joined to said end plates, wherein
      said end plates are united solely by means of said filter cartridges, and wherein
      at least one of said end plates includes a base plate and a seat plate joined to said base plate, and wherein
      said seat plate defines seat recesses for receiving therein respective end portions of said filter cartridges, and includes annular seat retaining rings associated with respective said seat recesses, and wherein
      said seat retaining rings have terminal annular edges which diametrically constrict said recesses such that said seat retaining rings are flexed outwardly by insertion of said respective end portions of said filter cartridges in said recesses to thereby cause said annular edges thereof to be forcibly engaged circumferentially with a filter medium of said respective end portions.

2. The caged filter cartridge assembly as in claim 1, wherein said base plate includes cylindrical support tubes associated with said respective recesses which project into central cylindrical passageways of said respective ones of said filter cartridges.

3. The caged filter cartridge assembly of claim 2, wherein said seat recesses include an annular end seal which surrounds said cylindrical support tube and is forcibly embedded within an end section of a filter medium associated with said respective ones of said filter cartridges.

4. The caged filter cartridge assembly of claim 3, wherein each of said retaining rings is coaxially disposed relative to said annular end seal and is spaced therefrom, and wherein said annular edges of said retaining rings establish a circumferential seal with said filter medium associated with said respective ones of said filter cartridges.

5. The caged filter cartridge assembly of claim 3, wherein said end seal has a generally triangular cross-section.

6. The caged filter cartridge assembly of claim 1, wherein said retaining ring is formed unitarily with said seat plate.

7. The caged filter cartridge assembly of claim 1, wherein one of said end plates includes a lift ring.

8. The caged filter cartridge assembly of claim 1, wherein said seat rings define segments of conical surfaces.

9. The caged filter cartridge assembly of claim 1, wherein said base and seat plates include heat-staked connection posts to immovably join said base and seat plates one to another.

10. A tie rod-less caged filter cartridge assembly comprising:
first and second spaced-apart end plates having a plurality of seat recesses formed therein;
a plurality of tubular elongate filter cartridges each having a tubular central passageway and a filter medium surrounding said central passageway; wherein
opposed end regions of said filter cartridges are received within respective ones of said seat recesses so as to structurally join said spaced-apart end plates one to another in the absence of any tie rod therebetween, and wherein
at least one of said first and second end plates includes a base plate and a seat plate joined to said base plate, and wherein
said seat plate defines, said seat recesses and unitarily includes respective annular seat retaining rings associated with said seat recesses having an edge which is forcibly engaged circumferentially with a respective end region of said filter cartridges.

11. The caged filter cartridge assembly as in claim 10, wherein each said seat recess includes a cylindrical support tube which projects into said central passageway of said filter cartridge seated therein.

12. The caged filter cartridge assembly of claim 11, wherein each said seat recess includes an annular end seal which surrounds said cylindrical support tube and is forcibly embedded within an end section of said filter medium of said filter cartridge seated therein.

13. The caged filter cartridge assembly of claim 12, wherein each said seat recess includes said retaining ring which is coaxially disposed relative to said annular end seal and spaced therefrom so as to establish a circumferential seal with said filter medium of said filter cartridge seated therein.

14. The caged filter cartridge assembly of claim 13, wherein said annular edge diametrically constricts said seat recess.

15. The caged filter cartridge assembly of claim 14, wherein said retaining ring is a segment of a conical surface.

16. The caged filter cartridge assembly of claim 15, wherein said end seal has a generally triangular cross-section.

17. The caged filter cartridge assembly of claim 10, wherein one of said end plates includes a lift ring.

18. The caged filter cartridge assembly of claim 10, wherein said filter medium includes a non-woven mass of melt-blown polymeric fibers.

19. The caged filter cartridge assembly of claim 10, wherein each of said first and second end plates include base and seat plates joined to one another.

20. A filtration system comprising a filtration housing defining an interior space and having fluid inlets and outlets for introducing fluid into, and discharging fluid from, respectively, said interior space of said housing, and a caged filter cartridge assembly according to any one of claims 1–7 and 9–19 positioned within said interior space of said filtration housing.

21. An end plate for a caged filter cartridge assembly comprising:
(i) a base plate and a seat plate joined to said base plate;
(ii) a plurality of seat recesses defined in said seat plate for receiving a respective end portion of a generally tubular filter cartridge therein, wherein each said seat recess includes a coaxial arrangement of:
a cylindrical support tube adapted to be received within a tubular central passageway of said respective filter cartridge end portion;
an annular end seal adapted to being embedded within a filter medium surrounding said central passageway of said respective filter cartridge end portion; and
an annular retaining ring unitarily formed with said seat plate and spaced from said end seal, wherein said retaining ring is adapted to be sealingly engaged with a circumferential portion of said filter medium surrounding said central passageway of aid respective filter cartridge end portion.

22. The end plate of claim 21, wherein said retaining ring includes an annular edge which diametrically constricts said seat recess.

23. The end plate of claim 22, wherein said retaining ring is a segment of a conical surface.

24. The end plate of claim 21, which further comprises an annular support wall coaxially surrounding said support tube, said end seal and said retaining ring.

25. The end plate of claim 24, wherein said support wall is unitarily formed with said seat plate and includes a terminal end in contact with said base plate.

26. The end plate of claim 21, wherein said end seal has a generally triangular cross-section.

27. The end plate of claim 21, which further comprises a lift ring.

28. The end plate of claim 21 wherein said base plate unitarily includes said cylindrical support tube and said end seal.

29. The end plate of claim 21, which includes a plurality of heat-staked posts which join said base and seat plates one to another.

30. A caged filter cartridge assembly comprising a pair of coaxially spaced-apart end plates, and a number of tubular filter cartridges extending between and joined to said end plates, wherein at least one of said end plates includes a base plate, and a seat plate which defines a plurality of recesses in which end portions of respective ones of said filter cartridges is received, said base plate joined to said seat plate, and wherein said base and seat plates include heat-staked connection posts to immovably join said base and seat plates one to another.

31. The caged filter cartridge assembly of claim 30, wherein said seat plate includes annular seat rings associate with respective ones of said recesses.

32. The caged filter cartridge assembly of claim 31, wherein each of said seat rings is a segment of a conical surface.

33. The caged filter cartridge assembly of claim 30 or 31, wherein said seat rings are unitarily formed with said seat plate.

34. The caged filter cartridge assembly as in claim 30, wherein said base plate includes cylindrical support tubes associated with said seat recesses which project into a central cylindrical passageway of said respective ones of said filter cartridges.

35. The caged filter cartridge assembly as in claim 1, 10, 30 or 34, wherein said seat plate comprises annular support walls coaxially associated with respective recesses.

36. The caged filter cartridge assembly as in claim 35, wherein said support walls include a terminal end in contact with said base plate.

\* \* \* \* \*